United States Patent [19]

Morawski et al.

[11] Patent Number: 4,570,950
[45] Date of Patent: Feb. 18, 1986

[54] COMPENSATING CHUCK

[76] Inventors: Longine V. Morawski; Lawrence V. Morawski, both of P.O. Box 631, Roseville, Mich. 48066

[21] Appl. No.: 624,920

[22] Filed: Jun. 27, 1984

[51] Int. Cl.[4] .............................................. B23B 31/16
[52] U.S. Cl. .................................. 279/1 J; 279/110; 279/123; 403/90
[58] Field of Search ...................... 279/1 J, 2 R, 6, 16, 279/17, 60, 110, 123, 1 L, 1 DA, 121, 61-65, 111-120, 122; 409/233; 82/DIG. 6, 40 R; 403/90, 131, 135

[56] References Cited

U.S. PATENT DOCUMENTS

| 1,578,163 | 3/1926 | Muehleib | 82/40 R |
| 3,082,015 | 3/1963 | Hohwart et al. | 279/1 J |
| 3,319,982 | 5/1967 | Schwartz | 403/90 |
| 3,610,642 | 10/1971 | Fischer et al. | 279/1 L |
| 3,633,929 | 1/1972 | Morawski et al. | 279/60 X |
| 3,707,293 | 12/1972 | Morawski et al. | 279/1 J X |
| 4,193,607 | 3/1980 | Pearson et al. | 279/1 L X |

Primary Examiner—Z. R. Bilinsky
Assistant Examiner—Steven C. Bishop
Attorney, Agent, or Firm—Barnes Kisselle Raisch Choate Whittemore & Hulbert

[57] ABSTRACT

The chuck disclosed has three radially movable jaws for gripping and releasing a workpiece. The jaws are displaced radially by means of a draw-bar actuated puller plate coupled to the inner ends of inclined, radially extending rods on which the jaws are mounted. The puller plate is swivelly coupled to the drawbar and to the jaw rods to enable the jaws to firmly grip a workpiece around a surface which is not concentric to a previously machined centering surface on the workpiece and by means of which the workpiece is positioned on the chuck. Means are provided for optionally preventing swiveling movement of the puller plate.

6 Claims, 7 Drawing Figures

Fig-1

COMPENSATING CHUCK

This invention relates to a chuck and, more particularly, to a chuck of the type having a plurality of circumferentially spaced jaws radially displaceable to grip and release a workpiece in response to axial movement of a drawbar within a machine spindle.

In machining workpieces it frequently becomes necessary to initially mount the workpiece in a chuck to machine or otherwise form an annular centering surface on the workpiece and thereafter again mount the workpiece on the chuck in a co-axial position located by the previously formed centering surface. When the workpiece is properly centered on the chuck other surfaces can be readily machined concentric to the centering surface. It frequently happens that the chuck cannot grip the workpiece at the centering surface with sufficient force to withstand the torque required by the subsequent machining operations. Accordingly, the chuck must have means thereon engageable with the centering surface to assure rotation of the workpiece about an axis concentric with the machine spindle axis and also additional means for gripping the workpiece with sufficient force to withstand the torque required for the subsequent machining operations.

One of the problems that arises in the machining sequence described is that the workpiece may be slightly out of round or the work gripping surface may not be concentric to the central axis of the workpiece. When a workpiece is initially chucked by gripping it on an out-of-round or non-concentric surface to machine the centering surface and is again subsequently chucked on the same out-of-round or non-concentric surface, the previously machined centering surface will in all probability not be concentric to the surface gripped by the chuck. Therefore, it becomes virtually impossible to position the workpiece on the chuck by means of the previously machined centering surface and at the same time cause the chuck jaws to firmly grip the workpiece on the out-of-round or non-concentric surface. Since the latter surface would not normally be concentric to the centering surface, one or more of the chuck jaws would engage the out-of-round or non-concentric surface on the workpiece prior to engagement of this surface by one or more of the other jaws.

The primary object of this invention is to eliminate the problem encountered in chucking workpieces which are out-of-round or non-concentric.

A more specific object of this invention is to provide a chuck adapted to locate a workpiece in a position accurately concentric with the machine tool spindle by engaging centering means on the chuck with a previously machined centering surface on the workpiece and tightly gripping the workpiece on an out-of-round or non-concentric surface thereof by means of jaws on the chuck which compensate for the eccentricity of the workpiece surface to be tightly gripped.

A further object of this invention resides in the provision of a chuck having permanently or removably mounted thereon a first set of jaws or other work-engaging members adapted to engage with a previously formed centering surface on the workpiece so that the centering surface will be co-axial to a high degree of accuracy with the spindle axis and also having a second set of jaws capable of being displaced radially different extents into firm gripping relation with a surface on the workpiece which is not concentric to the previously machined centering surface by means of which the workpiece is located coaxially on the chuck.

A more specific object of the invention resides in the provision of a chuck having a plurality of three jaws and a jaw actuating mechanism which can be arranged in one condition to shift the jaws radially simultaneously to exactly the same extent and, in another condition, to displace the jaws radially different extents necessary to effect a firm gripping relationship with a surface not concentric to the centering surface by means of which the workpiece is located on the chuck coaxially with the machine spindle.

Other objects, features and advantages of the present invention will become apparent from the following description and accompanying drawings, in which:

FIG. 1 is a horizontal axial sectional view of a chuck according to the present invention showing a workpiece centered on the chuck by means of a previously machined centering surface and also showing an out-of-round surface on the workpiece adapted to be firmly gripped by the chuck jaws;

Figure 1:
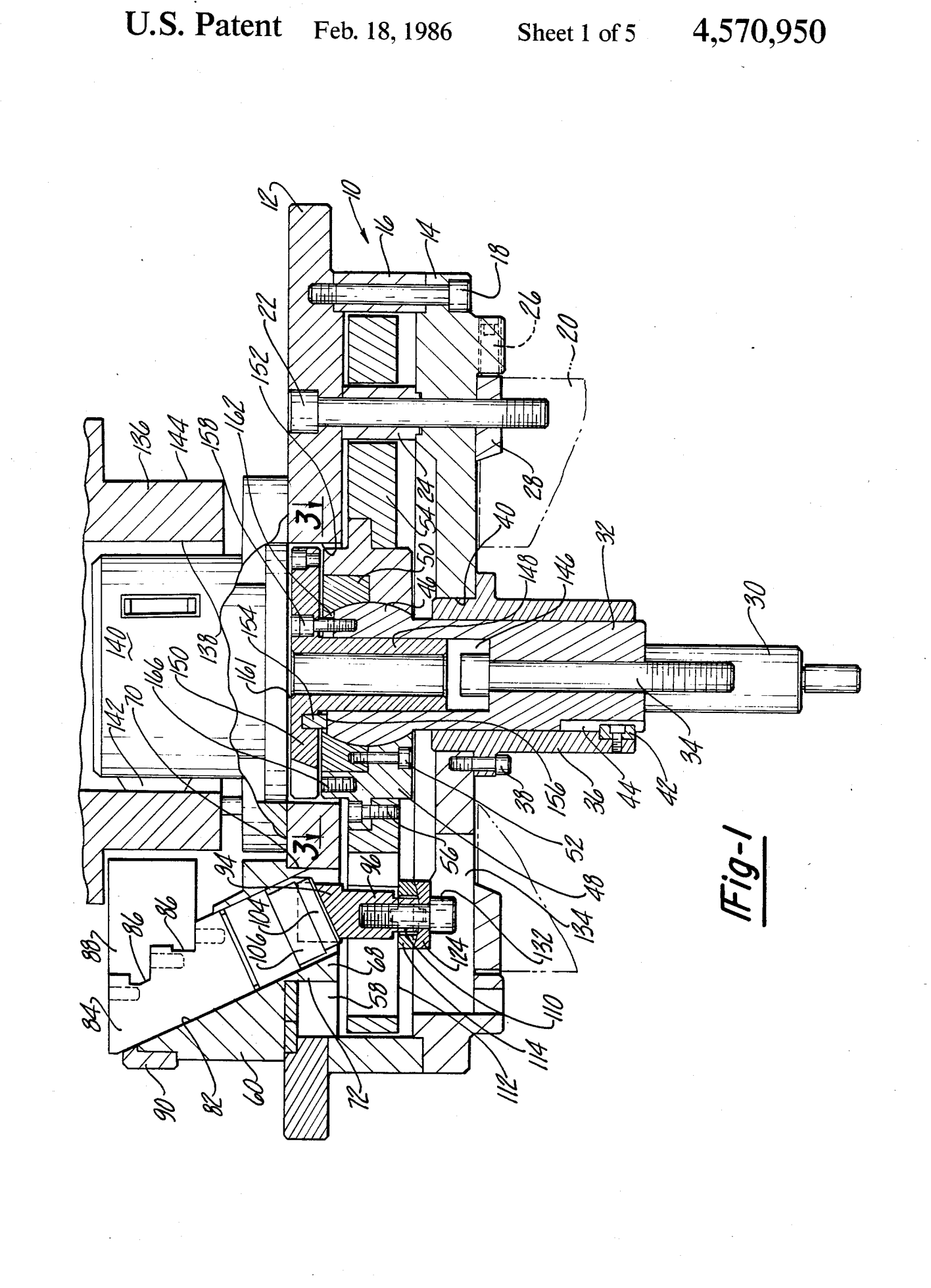
Figure 2:
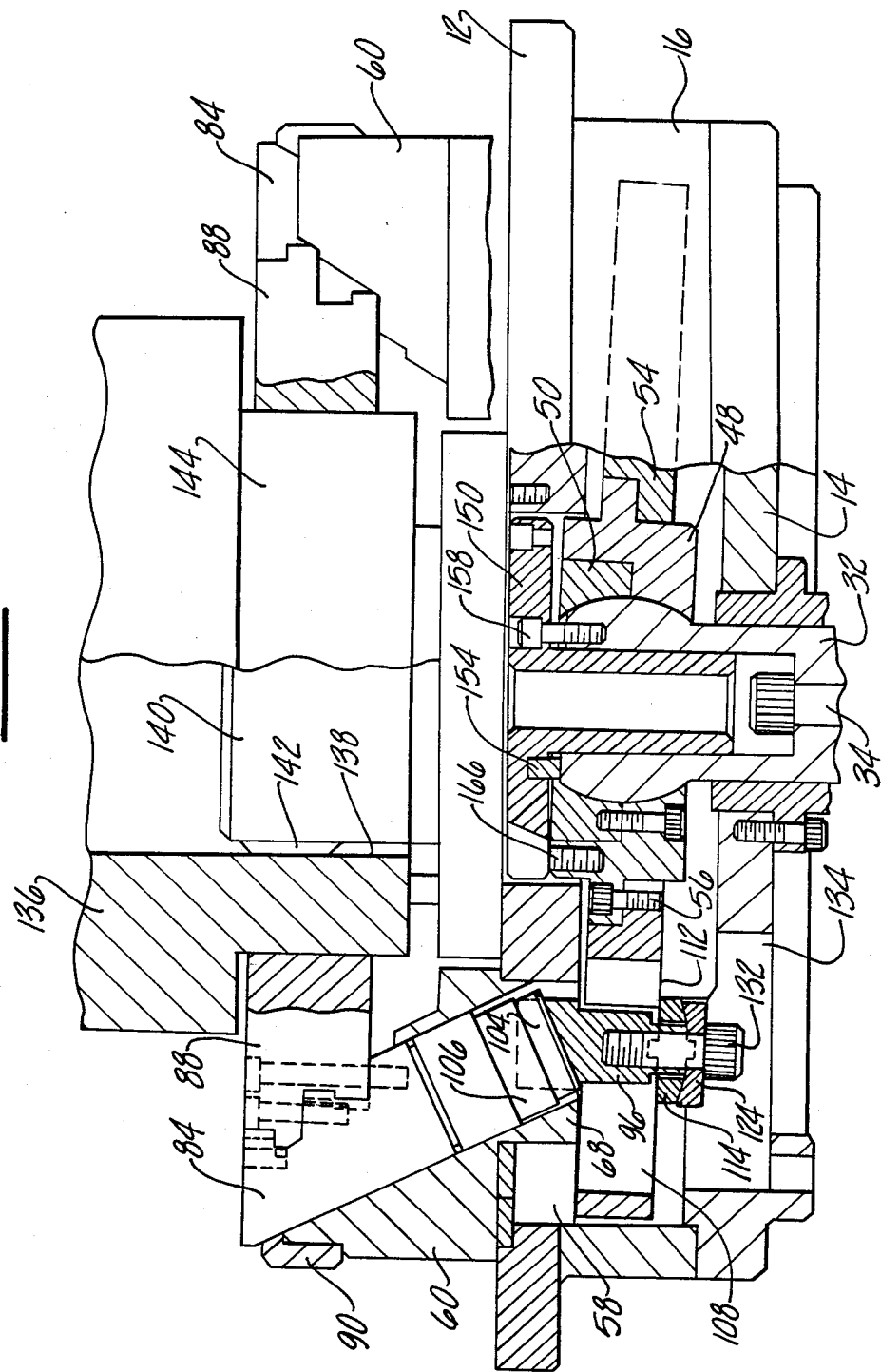
FIG. 2 is a view similar to FIG. 1 and showing the manner in which the chuck jaws are actuated to firmly grip the out-of-round surface on the workpiece.

In FIG. 1 of the drawings the chuck 10 is illustrated as having a front plate 12 and a rear plate 14 secured together in axially spaced relation by a spacer ring 16 and screws 18. The chuck is adapted to be mounted on the spindle 20 of a machine tool by means of screws 22 extending through the front and rear plates 12,14 of the chuck and through spacer bushings 24. The chuck is adjusted on the spindle in a position accurately concentric to the rotary axis of the spindle by means of radial screws 26 around the outer periphery of rear plate 14 which seat upon an adaptor ring 28 on the spindle.

An axially shiftable drawbar 30 at the axis of the spindle is connected to a drawbar adaptor 32 on the chuck by means of a screw 34. Drawbar adaptor 32 is guided axially on the chuck by a bushing 36 secured to rear plate 14 by screws 38. Bushing 36 extends through a central aperture 40 in rear plate 14. A key 42 on bushing 36 engages a keyway 44 in adaptor 32 to prevent the adaptor from rotating within bushing 36. The forward end portion 46 of adaptor 32 is located in the chamber between front and rear plates 12,14 and is spherically shaped. A flanged member 48 is seated on spherical end portion 46 of adaptor 32 for swiveling movement thereon and is retained in place by means of a keeper 50. Flange member 48 and keeper 50 are secured together by screws 52. A puller plate 54 is fixedly mounted on flange member 48 by a plurality of screws 56.

Front plate 12 of the chuck is provided with three radially elongated openings 58 which are spaced circumferentially around the central axis of the chuck. A jaw support block 60 is mounted on the front face of plate 12 overlying each opening 58. Each support block 60 is provided at each side thereof with a plurality of radially spaced openings 62 and along each side of opening 58 plate 12 is provided with registering threaded openings 64. The arrangement of these openings is such that the support block 60 can be secured to the front face of plate 12 in different radially located positions by means of screws 66 extending through selected openings 62 and threaded into the registering openings 64. Each support block 60 has at the rear side thereof an extension 68 projecting through the opening 58 in plate 12. Extension 68 has flat radially inner and radially outer shoulders 70,72. When the jaw block 60 is located radially in the position shown in FIG. 1 the radially inner shoulder 70 abuts against the radially inner end 74 of opening 58 and the radially outer shoulder 72 abuts against the radially inner edge of a spacer strap 76 extending across opening 58 and having its opposite ends seated in recessed edge portions 78 at each side of opening 58. In the radial location of the support block 60 shown in FIG. 1 two such straps 76 are utilized. In the event the support block 60 is located in its radially outermost position, shoulder 72 of extension 68 would abut the radially outer end 80 of opening 58. This arrangement permits a very precise radial location of each jaw.

Each support block 60 is formed with a cylindrical bore 82 inclined radially inwardly toward the axis of the chuck in a rearward direction. Within each bore there is slideably arranged a jaw rod 84 having a plurality of stepped surfaces 86 thereon for accommodating a jaw 88. Jaw rod 84 is prevented from rotating within bore 82 by means of a key 90.

Figure 7:
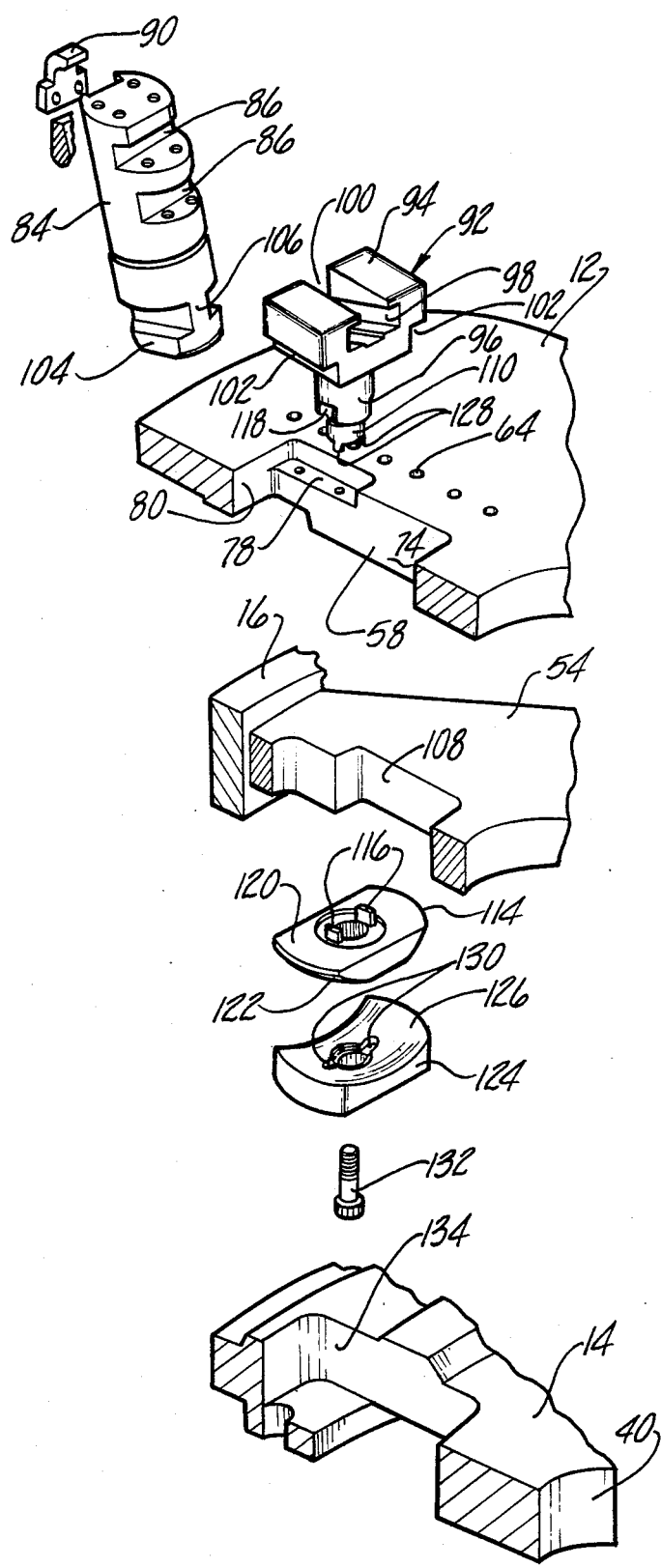
FIG. 7 is a fragmentary exploded view of a portion of the chuck.

Each jaw rod 84 is interconnected with puller plate 54 by a coupling 92. Coupling 92 is best illustrated in FIG. 7 and comprises a front block section 94 and a rearwardly extending shaft portion 96. The block section 94 is formed with an inclined slot 98 communicating with the front face of the block section by a straight passageway 100. At each side the rear face of block section 94 is relieved laterally inwardly as at 102. At its axially inner end each jaw rod 84 is formed with a pair of laterally outwardly extending tangs 104 connected with the body portion of the rod by a flat neck portion 106 of reduced thickness. Tangs 104 and neck 106 are dimensioned so that they will have a sliding fit with slot 98 and passageway 100 in the block section 94 of coupling 86.

At the location of each coupling 92 puller plate 54 is formed with a radially elongated opening 108 through which the shaft portion 96 of coupling 92 extends. The rear end of shank portion 96 has a cylindrical stem 110 of reduced diameter which projects rearwardly beyond the rear face 112 of puller plate 54. A disc 114 is slideably arranged over the stem 110 and has a pair of ears 116 which engage flattened sections 118 on shank portion 96 to prevent substantial rotation of disc 114 on stem 110. The front face 120 of disc 114 is flat and the opposite face 122 is shaped as a segment of a sphere. A second disc 124 has a concave spherically shaped surface 126 engaging the surface 122 of disc 114. Two ears 128 at the rear end of stem 110 extend loosely into pockets 130 on disc 124 to prevent disc 124 from rotating substantially relative to disc 114. Pockets 130 are sufficiently large to permit disc 124 to swivel or rock on disc 114 in a direction perpendicular to the orientation of pockets 130; that is, in a direction radially of the chuck. A screw 132 extends through discs 124,114 and threads into the shaft portion 96 of coupling 92 to retain the flat forward face 120 of disc 114 in coplanar engagement with the rear face 112 of puller plate 54.

Figure 6:
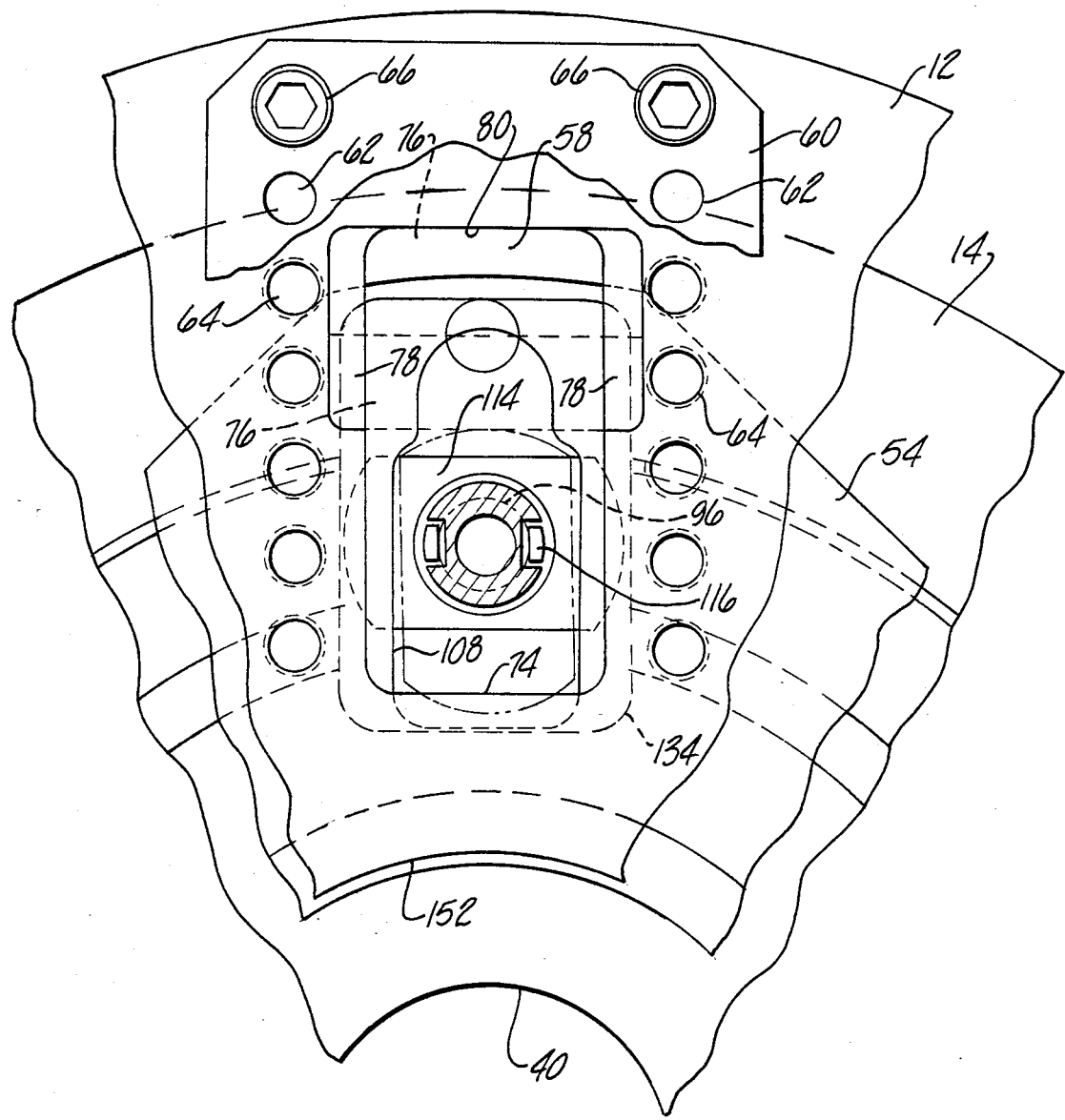
FIG. 6 is a fragmentary plan view of the chuck.

It will be observed from FIGS. 6 and 7 that in the assembled relation discs 114,124 span across the opening 108 in puller plate 54. However, these discs have a width in the opposite direction less than the width of opening 108 in puller plate 54 and opening 58 in front plate 12. It therefore follows that, when the screws 66 retaining the support block 60 on the front face of plate 12 are removed, the entire jaw assembly, including jaw rod 84, coupling 92 and discs 114,124, can be rotated 90° to remove it from the chuck. Back plate 14 is provided with three radially elongated openings 134 to serve as clearance for screws 132.

The chuck of the present invention is provided with a means on the front face thereof for supporting a workpiece coaxial with the chuck by engaging a machined centering surface on the workpiece. These means could be a conventional conically-shaped centering shaft. In the embodiment illustrated the workpiece is designated 136 and the previously machined centering surface comprises a cylindrical bore 138 rather than a conical recess. Where the centering surface on the workpiece comprises a cylindrical bore (such as indicated at 138), the centering means on the chuck can take the form of a collet chuck 140 having a plurality of radially projecting collet fingers 142 resiliently engageable with bore 138. Regardless of the specific form of centering means employed, in many machining operations the centering means on the chuck are incapable of gripping the workpiece with sufficient force to withstand the torque on the workpiece resulting from the necessary machining operations. In the present chuck the collet chuck 140 retains the workpiece 136 coaxially on the chuck. The gripping force required to withstand the torque on the workpiece is applied by the jaws 88 gripping a cylindrical surface 144 on the workpiece. However, it will be appreciated that the surface 144 may be out of round or may not be concentric with bore 138. Therefore, when the collet chuck is actuated to cause the fingers 142 to engage bore 138, the three jaws 88 may be spaced from the cylindrical surface 144 on the workpiece slightly different distances. In the embodiment illustrated in FIGS. 1 and 2 the chuck is conditioned to cause the three jaws 88 to compensate for any slightly out-of-roundness or eccentricity between the surface 144 on the workpiece and bore 138 by means of which the workpiece is centered on the chuck.

In the above described chuck, when drawbar 30 is retracted, puller plate 54 is shifted rearwardly and through couplings 96 the three jaws 88 are displaced radially inwardly. In view of the swivel connection between the spherical forward end 46 of drawbar adaptor 32 and puller plate 54, as soon as one of the jaws 88 contacts the cylindrical surface 144 on the workpiece, its radial inward movement is arrested even though retraction of the drawbar may continue. When this occurs, the puller plate 54 tilts or swivels on the spherical portion 46 of the drawbar adaptor as shown in FIG. 2. Thus, even though the radial inward movement of one of the jaws 88 is arrested, continued retraction of the drawbar will cause the two remaining jaws to shift radially inwardly to engage the juxtaposed portions of the cylindrical surface 144 on the workpiece. It will be apparent that this tilting or swiveling movement of puller plate 54 is permitted by reason of the spherical connection between the drawbar adaptor 32 and the puller plate and the swivel connection between discs 124 and 114.

Figure 3:
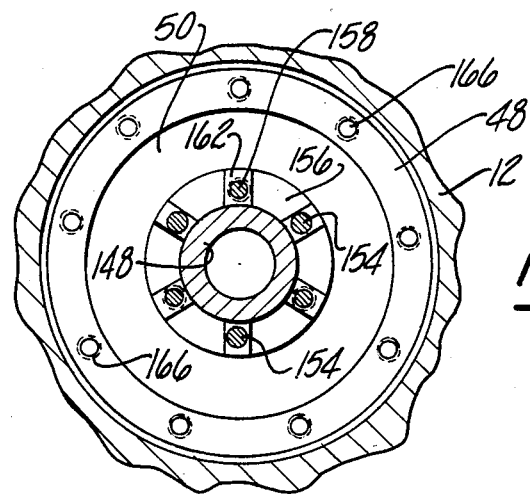
FIG. 3 is a sectional view along the line 3—3 in FIG. 1.
Figure 4:
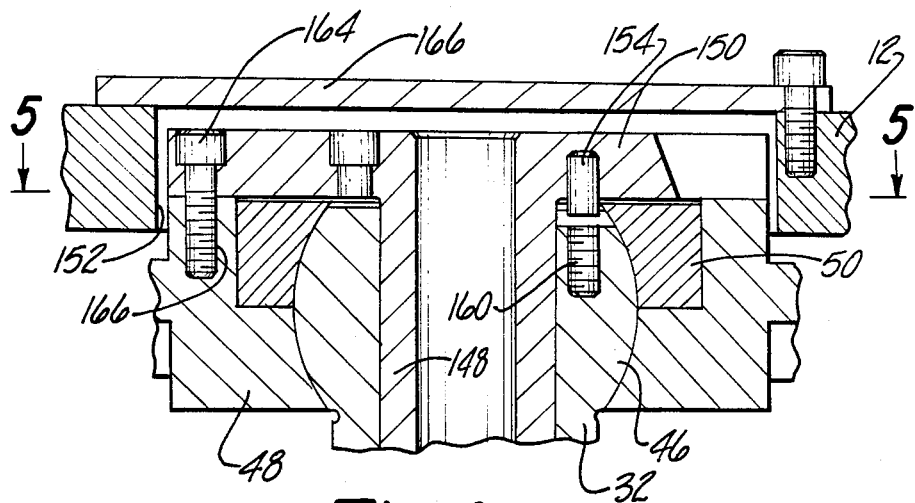
FIG. 4 is a fragmentary sectional view of the chuck with the workpiece centering mechanism removed and the jaw actuating mechanism arranged to shift all of the jaws radially to the same extent.
Figure 5:
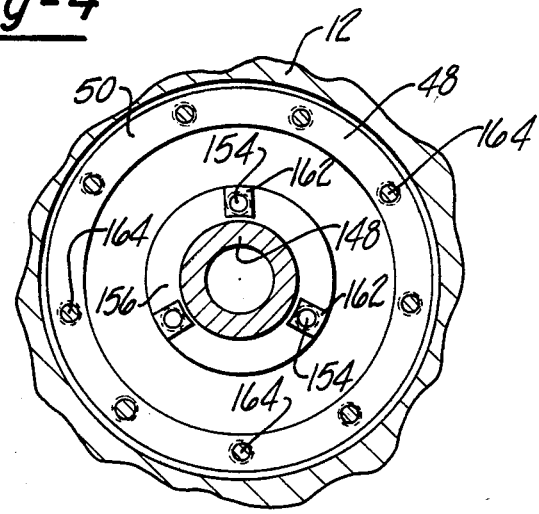
FIG. 5 is a sectional view along the line 5—5 in FIG. 4.

While the provision of the compensating jaws on the chuck is desirable for situations as described above, it will be apparent that in many instances it is necessary or at least desirable to have each of the jaws shift radially inwardly exactly the same extent when the drawbar is retracted. The present chuck is designed so that the jaws can be conditioned to be compensating or non-compensating. Thus, as shown in the drawings, the forward end of drawbar adaptor 32 is formed with a central bore 146 in which is received a cylindrical stem 148 projecting rearwardly from the rear face of a plate 150 within the central opening 152 of the front plate 12 of the chuck. As is best shown in FIGS. 3, 4 and 5, three pins 154 project rearwardly from the rear face of plate 150. In the rotative position of plate 150 illustrated in FIGS. 1, 2 and 3 pins 154 seat against the front end face 156 of the spherical portion 46. In this position three screws 158 extending through plate 150 thread into registering openings 160 in the spherical portion 46 of the drawbar adaptor. In this condition plate 150 is rigidly secured to the drawbar adaptor.

However, when screws 158 are removed, plate 150 can be rotated to the position shown in FIGS. 4 and 5 wherein the three pins 154 register with deep radial slots 162 in the front end face of the spherical portion 46. Screws 164 can then be extended through plate 150 into threaded engagement with openings 166 in the flanged member 48. In this condition the puller plate 54 is now rigidly connected to plate 150 and, since the latter cannot tilt about the axis of the chuck, the puller plate is constrained to move purely in an axial direction and cannot tilt on the spherical portion 46 of the drawbar adaptor 32.

Thus, when initially machining the workpiece 136 the collet chuck 140 can be removed and the opening 152 in front plate 12 can be closed by a cover plate 166. The plate 150 is secured to the flanged member 48 in the manner illustrated in FIGS. 4 and 5. The drawbar can then be actuated to cause the jaws 88 to firmly grip the workpiece at three locations around the surface 144. Bore 138 can be machined while the workpiece is gripped in this manner. After bore 138 is machined, the workpiece is removed from the chuck and cover plate 166 is removed. Screws 158 are removed and plate 150 is then rotated and secured to the spherical end 46 of the drawbar adaptor as shown in FIGS. 1 and 2. Collet chuck 140 is mounted on front plate 12 as shown and is designed to be operated by reciprocation of drawbar 30 acting through plate 150. The workpiece can then be centered on the chuck by means of collet chuck 140 and firmly gripped by each of the three compensating jaws 88 by retracting the drawbar as described above.

We claim:

1. A chuck adapted to be mounted on a spindle of a machine tool for rotatably supporting a workpiece, comprising: a chuck body having a central axis and means for mounting the body coaxially on the spindle, a plurality of jaw rods mounted on the chuck body in circumferentially spaced relation for sliding movement along axes similarly inclined at an acute angle to the central axis of the body, a plurality of jaws mounted on outer ends of the rods, axially inner ends of the rods extending into said body, a jaw actuator in the body arranged for axial movement along the central axis of the body, a puller plate in the body extending generally transversely of the central axis of the body and connected at a central portion thereof with said jaw actuator, means connecting the axially inner end of each jaw rod with said puller plate so that the outer ends of the jaws are displaced radially in response to axial displacement of the puller plate, a swivel connection between the puller plate and the jaw actuator enabling the puller plate to swivel relative to the jaw actuator, a swivel connection between each jaw rod and the puller plate enabling the puller plate to swivel relative to the jaw rod, whereby, when the actuator is displaced in a direction to cause the jaws to shift radially, after a first jaw engages the workpiece, continued displacement of the actuator in said direction causes the puller plate to swivel on the actuator and also relative to said one jaw until the other jaws engage the workpiece, said chuck including a rigid lock out member constrained to move axially in said body with said actuator, said lock out member comprising a lock out plate extending radially across a forward end of the actuator and at least said central portion of the puller plate, said lock out plate having a first set of circumferentially spaced holes therethrough adapted to register with threaded openings in the actuator for receiving a first set of screws to clamp the lock out plate to the actuator, said lock out plate having a second set of circumferentially spaced holes therethrough adapted to register with threaded openings in the puller plate for receiving a second set of screws to clamp the lock out plate to the puller plate and thereby prevent swiveling movement of the puller plate.

2. A chuck as called for in claim 1 wherein the lock out plate is rotatable about the central axis of the body from a first position wherein the first set of holes in the lock out plate register with the threaded openings in the actuator to a second position wherein the second set of holes in the lock out plate register with the threaded openings in the puller plate.

3. A chuck as called for in claim 2 including a plurality of axial projections extending rearwardly from the lock out plate toward an adjacent end of the actuator, said projections being arranged to abut said end of the actuator to retain the lock out plate spaced axially from radially adjacent portions of the puller plate when said first set of screws connect the actuator with the lock out plate, said adjacent end of the actuator having recesses therein registering with said projections when said second set of screws connect the lock out plate with the puller plate.

4. A chuck as called for in claim 3 wherein the swivel connection between the puller plate and the inner end of each jaw rod includes a coupling having a radially slideable connection with the jaw rod and a radially slideable connection with the puller plate, said puller plate having a radially elongated slot therethrough registering with the inner end of the jaw rod and through which the coupling extends, said coupling having means swivelly mounted thereon, spanning said slot circumferentially and engaging the rear face of the puller plate.

5. A chuck as called for in claim 4 wherein said swivelly mounted means comprises a first disc mounted on the rear end portion of said coupling, said disc having a front face engaging the rear face of the puller plate and an arcuately convex rear face, a second disc having a concave front face engaging the rear face of the first disc and a screw securing both discs on the rear end of the coupling, said discs being relatively swivelable in a direction radially of the puller plate.

6. A chuck as called for in claim 5 wherein the central portion of the secnod disc abuts the rear end of said coupling and said last-mentioned screw clamps the first disc between the rear face of the puller plate and the front face of the second disc.

* * * * *